Patented Aug. 31, 1926.

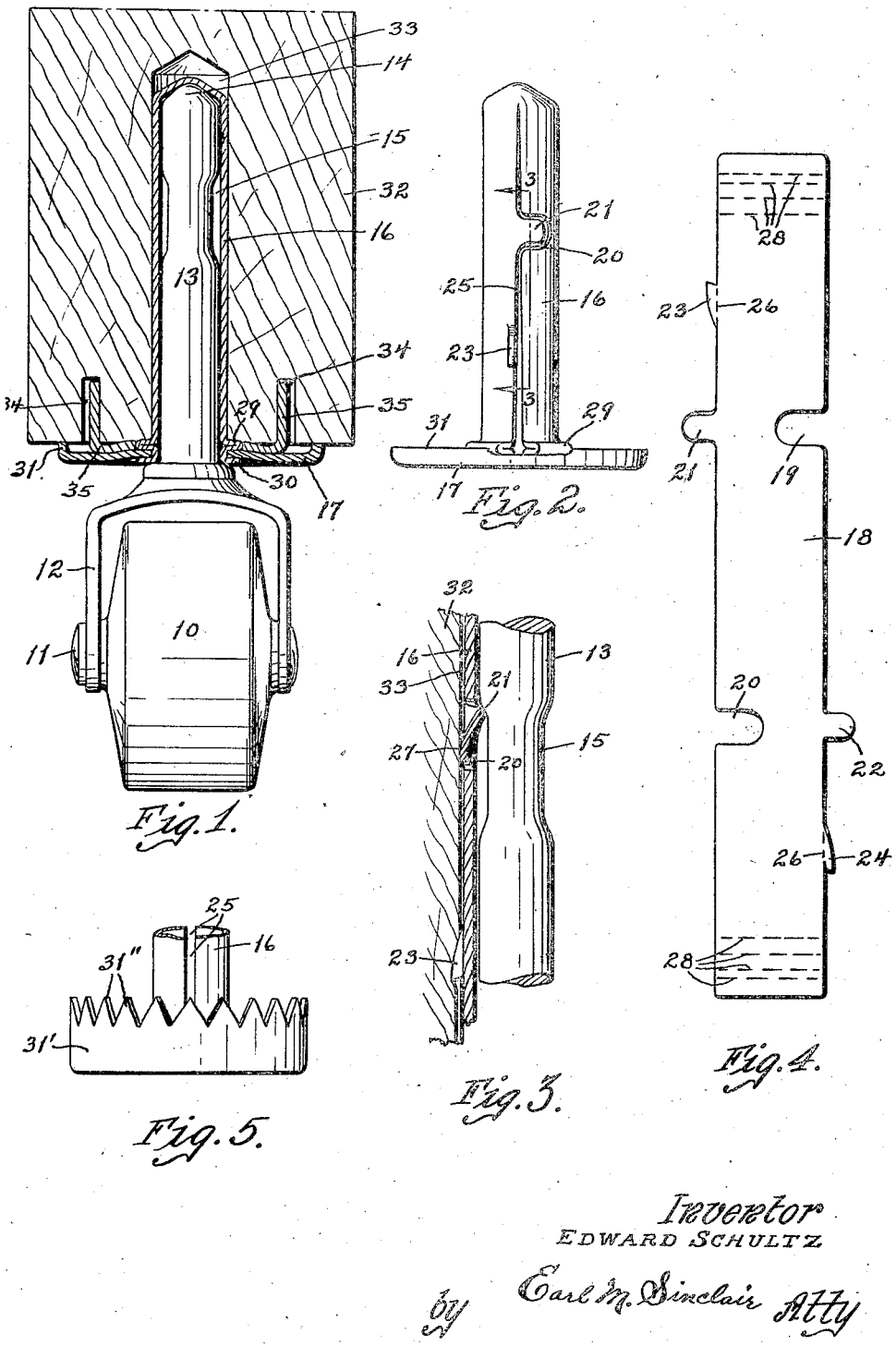

1,597,925

UNITED STATES PATENT OFFICE.

EDWARD SCHULTZ, OF CHICAGO, ILLINOIS, ASSIGNOR TO JAMES B. LADD, OF DES MOINES, IOWA.

CASTER.

Application filed November 24, 1924. Serial No. 751,810.

The object of this invention is to provide an improved construction for a swiveling caster for furniture and the like.

More specifically, the object of this invention is to provide an improved thimble with means for engaging frictionally with the caster stem whereby the stem is held removably and replaceably therein.

A further object of this invention is to provide an improved thimble with means for engaging a socket in the load object.

A further object of this invention is to provide an improved combination including a stem-receiving thimble adapted to be inserted in a socket in the load object, and a reinforcing ferrule seated in an annular groove concentric with the socket to prevent splitting of the wood in which the socket is formed.

With these and other objects in view, my invention consists in the construction, arrangement and combination of elements hereinafter set forth, pointed out in the claims and illustrated by the accompanying drawing, in which—

Figure 1 is a view showing the caster in elevation and the bearing thimble, load object and ferrule in vertical section, these members being assembled as required for practical use. Figure 2 is an elevation of the thimble. Figure 3 is a detail sectional view showing the means on the thimble for engaging the stem and the load object. Figure 4 is a plan view of the blank from which the sleeve of the thimble is formed.

Figure 5 is an elevation of the lower portion of the thimble, showing a slightly modified form.

The construction of the caster itself forms no part of my present invention, and in the accompanying drawing a caster of conventional form is shown, comprising a roller 10 mounted for rotation on an axle 11 extending transversely of a fork 12, from which a stem 13 projects upwardly. The stem 13 has its upper end somewhat rounded or formed in the shape of a blunted cone to provide a bearing point 14, and is formed between its ends, but nearer the upper than the lower end, with a circumferential depression 15.

A bearing thimble is formed of two parts, a sleeve portion 16 and a base 17. The sleeve portion is formed from a blank of rectangular strip shape shown in Figure 4, said blank comprising a body 18, having U-shaped notches 19, 20 on opposite sides, and projecting lugs 21, 22 opposed to said notches. The lugs 21, 22 are of the same general shape as the notches, but of slightly less dimensions, so that they may project within said notches without contacting their margins, when the sleeve is formed as shown in Figure 2. The notch 19 and lug 21 are spaced in one direction from the center of the body 18 a distance corresponding to the spacing of the notch 20 and lug 22 in the opposite direction from such center. The body 18 is also formed with a pair of projecting teeth 23, 24, substantially triangular in form and located respectively between the lugs 21, 22 and the ends of the strip, the ends of the teeth nearest the ends of the strip being substantially at right angles to the side margins of the strip so as to form square shoulders. In forming the sleeve 16, the blank is bent and shaped, by the use of suitable dies, being bent practically double at its center and curved to form a top bearing adapted to conform to and rest on the bearing point 14 of the stem 13, and the opposite portions of the body of said blank being shaped to semi-cylindrical form to encompass and enclose the major portion of said stem, the process producing a substantially cylindrical sleeve, 16, closed at its upper end and open at its lower end and formed with diametrically opposed vertical slits 25, one of which is shown in Figure 2, extending from the lower end of the sleeve nearly to the upper end thereof. The teeth 23, 24 are bent outwardly on the dotted lines 26 of Figure 4, substantially at right angles to their original positions, so that they project radially of the sleeve and on opposite sides thereof, as shown most clearly in Figure 3. In the forming operation the lugs 21, 22 are caused to enter, respectively, the notches 20 and 19, and are also twisted on lines longitudinally of the sleeve, so that their upper margins project inwardly past the inner surface of the wall of the sleeve, as shown in Figure 3. The lower margins of the twisted lugs project but little, if any, beyond the outer surface of the wall of the sleeve, but are bent to form bearing shoulders 27 (Figure 3) having a function which will be made clear. The base 17 of the thimble is a disk of annular form adapted to slip over the lower end of the sleeve 16 and be secured thereto, As shown, the ends of the sleeve are bent and shaped on the transverse lines 28 (Figure 4) to produce an annular ridge 29 engaging above the base 17, and an annular flange 30 engaging below said base and crimped or clamped relative thereto, whereby the base is securely held in place. The base 17 preferably is dished or formed concavo-convex in section, whereby a peripheral flange 31 is formed.

The load object 32, which may be the leg of an article of furniture, is formed with a fore or socket 33 extending upwardly from its lower surface, of a diameter to receive snugly the sleeve 16, which owing to its method of construction, and the presence of the vertical slits 25, is of somewhat resilient nature so that it will yield to permit insertion in the bore or socket, and expand sufficiently to resist efforts to remove it unless some little force is applied. The teeth 23, 24 of the sleeve bite and gouge into the wood of the object 32, as the sleeve is inserted, and resist a tendency of the sleeve to move in said object after it is seated, particularly any tendency toward rotary movement in the bore or socket. The bearing shoulders 27 of the lugs 21, 22 have bearing against the wall of the bore or socket 33, and resist any tendency of said lugs to move outwardly on radial lines. The stem 13 of the caster is inserted in the sleeve from below, and the upper end thereof moves past the twisted lugs 21, 22, causing them to spring outwardly enough to permit the stem to pass, until said lugs snap into the annular depression 15 of the stem, and the stem is prevented from dropping out by engagement of the upper margins of said lugs with the shoulder at the upper end of said depression, as clearly shown in Figure 3. However, this depression is not of such depth, or the shoulder at its upper end of sufficient prominence, to prevent purposeful withdrawal of the caster stem when manual force is applied for that purpose, the lugs then yielding sufficiently to permit the upper end of the stem to pass by them. The bearing of the shoulders 27 of the twisted lugs is sufficient, against the wall of the bore, to normally hold the lugs in engagement with the stem and prevent accidental withdrawal.

The lower end of the load object 32 preferably is formed with an annular groove 34 (Figure 1) concentric with the bore or socket 33. A ferrule 35 is provided, having a central hole to receive the sleeve 16, its body underlying that portion of the load object between the bore or socket 33 and the annular groove 34, and its rim being received, by a tight drive fit, within said groove. The rim of the ferrule 35 fits snugly against and embraces the annular portion of the load object between the groove and the bore, and prevents any tendency to split or give way which might be caused by insertion of the sleeve, and in use strengthens and reinforces such portion of the load object. It is of course applied before the thimble is put in place, and as it is of less diameter than the base 17 of the thimble, which is dished or concaved as before recited, the peripheral flange 31 of said base may contact the lower surface of the load object outside of the ferrule as shown in Figure 1.

If desired, the rim 31' of the base may be formed with teeth or serrations 31'' on its upper margin, as shown in Figure 5, which may be caused to penetrate the load object.

In use the parts are assembled as shown and described, and the caster stem may swivel freely in the sleeve 16, the upper end of which rests on the bearing point 14 of the stem, whereby the load is borne on the upper end of the caster stem. The stem fits quite closely within the sleeve (except that portion containing the depression 15), so that lateral movement of the stem in the sleeve is reduced to a minimum, and efficiency of the caster is maintained over a long period of use.

The provision of the twisted lugs 21, 22, with their shouldered bearings or heels 27 engaging the wall of the bore 33 at diametrically opposite points, is believed to be of extreme importance. This arrangement eliminates a great trouble commonly found in top bearing casters, namely the tendency induced by travel of the caster over rough surfaces, to loosen the stem in the sleeve or thimble, and the sleeve or thimble in the bore, by repeated pounding with a considerable lever advantage, the caster fulcruming and oscillating on a point near the lower end of the stem. In my caster the oscillation is practically eliminated by means of the lugs 21, 22 as before stated, their bearing on the wall of the bore, and the fact that the upper end portion of the stem is securely journaled in the solid upper end of the sleeve above said lugs.

The elimination of teeth on the base 17 of the thimble, which so frequently cause splitting of the leg when driven in, and the use of the reenforcing ferrule 35 in an annular groove previously provided, are also points of importance. Any tendency of the thimble to rotate in the bore, which might be increased by having a smooth flange 31, is overcome by the use of the teeth 23, 24 engaging the load object within the bore.

I claim as my invention—

1. A caster having a stem and a thimble enclosing the same, said stem being formed with a depression between its ends, said thimble being formed with a vertical slit and with a lug projecting laterally from a margin of said slit, and also formed with a notch on the opposite side of said slit to receive said lug, said lug being twisted between its ends whereby the upper portion of its free end projects interiorly of the thimble and is adapted to engage in the depression of said stem.

2. The combination with a load object formed with a bore and a caster having a stem, of a sleeve adapted to fit snugly within said bore, said sleeve being formed with a vertical slot, a lug integrally formed at one margin of said slot and twisted on a line longitudinally of the sleeve so that the upper portion of its free end projects interiorly of the sleeve, said stem being adapted to fit snugly within said sleeve and formed with a depression within which the inwardly projecting upper portion of said twisted lug projects, the lower portion of said twisted lug lying outside of its normal vertical plane so as to bear against the wall of the bore and tending to prevent outward movement of said lug.

3. The combination with a load object having a bore and a caster stem thimble adapted to be inserted therein, said load object being formed with an annular groove concentric with said bore, of a reenforcing ferrule adapted to be inserted in said groove and to embrace the portion of the load object between said groove and the bore, said thimble being provided with a base disk below said ferrule and greater in diameter and formed with a peripheral flange extending upwardly a distance corresponding substantially to the thickness of the base portion of said ferrule, the flange of said base disk adapted to engage the load object concentrically of said annular groove.

Signed at Chicago, in the county of Cook and State of Illinois, this 10th day of October, 1924.

EDWARD SCHULTZ.